(12) United States Patent
Kupiszewski et al.

(10) Patent No.: US 12,313,351 B2
(45) Date of Patent: May 27, 2025

(54) ASYMMETRIC FLOW PATH TOPOLOGY

(71) Applicant: General Electric Company, Evendale, OH (US)

(72) Inventors: Thomas Kupiszewski, Liberty Township, OH (US); Jeffrey Douglas Rambo, Mason, OH (US); Emily Rosette Clark, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/872,174

(22) Filed: Jul. 25, 2022

(65) Prior Publication Data
US 2022/0364800 A1    Nov. 17, 2022

Related U.S. Application Data

(63) Continuation of application No. 16/573,084, filed on Sep. 17, 2019, now Pat. No. 11,397,059.

(51) Int. Cl.
F28F 13/06 (2006.01)
F28F 1/40 (2006.01)
F28F 13/18 (2006.01)
B21C 37/20 (2006.01)
F28F 1/26 (2006.01)
F28F 1/36 (2006.01)
F28F 1/42 (2006.01)

(52) U.S. Cl.
CPC .............. F28F 1/40 (2013.01); F28F 13/06 (2013.01); F28F 13/187 (2013.01); B21C 37/207 (2013.01); F28F 1/26 (2013.01); F28F 1/36 (2013.01); F28F 1/422 (2013.01)

(58) Field of Classification Search
CPC ........ F28F 13/06; F28F 13/08; F28F 2250/02; F28F 1/022
See application file for complete search history.

(56) References Cited

U.S. PATENT DOCUMENTS

| | | |
|---|---|---|
| 3,741,285 A | 6/1973 | Kuethe |
| 4,314,587 A | 2/1982 | Hackett |
| 4,966,523 A | 10/1990 | Sherikar |
| 5,337,568 A | 8/1994 | Lee et al. |
| 5,983,985 A | 11/1999 | Counterman et al. |
| 6,142,734 A | 11/2000 | Lee |
| 6,582,584 B2 | 6/2003 | Lee et al. |

(Continued)

Primary Examiner — Eric S Ruppert
(74) Attorney, Agent, or Firm — McCarter & English, LLP

(57) ABSTRACT

Flow paths and boundary layer restart features are provided. For example, a flow path comprises a flow path wall defining an inner flow path surface and an asymmetric notch defined in the flow path wall. The asymmetric notch comprises a first surface and a second surface and is asymmetric about a first line extending through an intersection of the first and second surfaces. Further, a flow boundary layer restart feature comprises a first surface extending inward with respect to a flow path surface of a flow path and a second surface extending inward with respect to the flow path surface. The second surface is asymmetric with respect to the first surface such that the first and second surfaces define an asymmetric notch. Additionally, a flow path wall may comprise an asymmetric notch that includes a flow expansion angle and a flow contraction angle that are unequal.

16 Claims, 14 Drawing Sheets

(56) References Cited

U.S. PATENT DOCUMENTS

| | | |
|---|---|---|
| 6,589,600 B1 | 7/2003 | Hasz et al. |
| 6,644,921 B2 | 11/2003 | Bunker et al. |
| 7,766,615 B2 | 8/2010 | Spangler et al. |
| 8,083,485 B2 | 12/2011 | Chon et al. |
| 8,210,812 B2 | 7/2012 | Abdel-Messeh et al. |
| 8,535,781 B2 * | 9/2013 | Van Merksteijn ...... F15D 1/003 |
| | | 428/167 |
| 8,770,232 B2 | 7/2014 | Onodera et al. |
| 9,334,755 B2 | 5/2016 | Riley et al. |
| 9,388,700 B2 | 7/2016 | Propheter-Hinckley et al. |
| 9,551,229 B2 | 1/2017 | Rodriguez et al. |
| 9,574,449 B2 | 2/2017 | Eifel et al. |
| 9,835,088 B2 | 12/2017 | Shchukin et al. |
| 2003/0019614 A1 | 1/2003 | Iwamoto et al. |
| 2009/0121365 A1 | 5/2009 | Jacobs et al. |
| 2009/0183862 A1 * | 7/2009 | Benezech ............... F28F 13/08 |
| | | 165/170 |
| 2013/0125992 A1 | 5/2013 | Krautschick et al. |
| 2015/0003975 A1 | 1/2015 | Shchukin et al. |
| 2017/0240271 A1 | 8/2017 | Fasel |

* cited by examiner

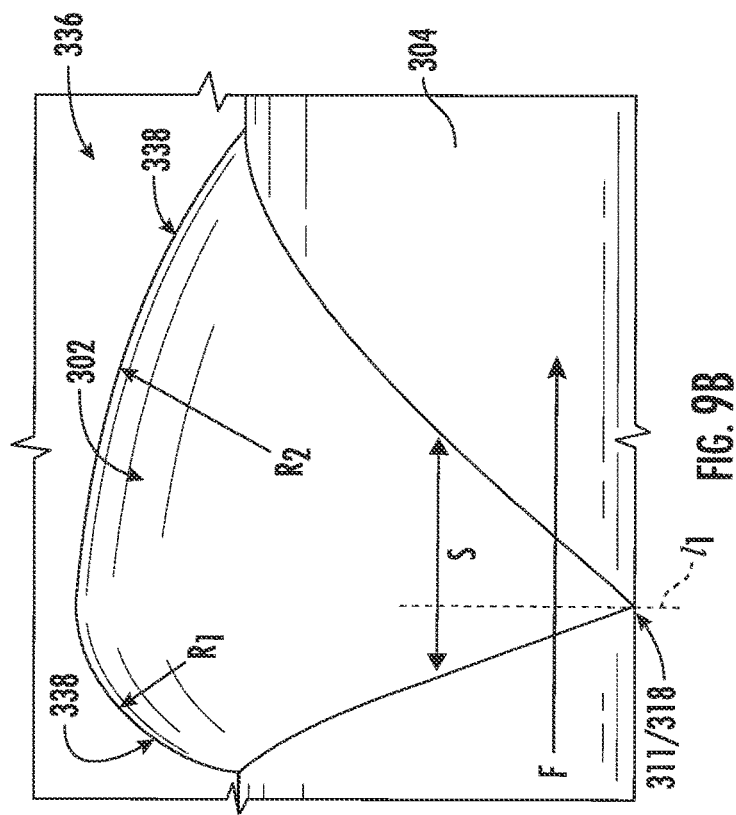
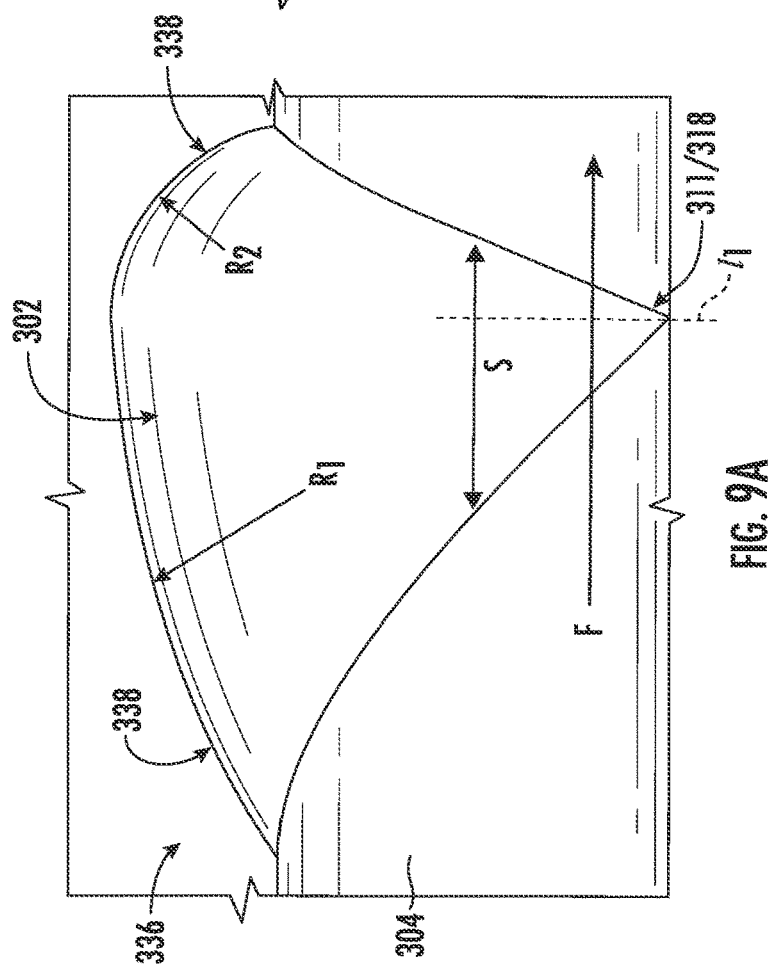

ASYMMETRIC FLOW PATH TOPOLOGY

CROSS-REFERENCE TO RELATED APPLICATIONS

This application is a continuation of and claims priority to U.S. Application Ser. No. 16/573,084, filed Sep. 17, 2019, the contents of which are incorporated herein in their entirety by reference.

FIELD

The present subject matter relates generally to fluid flow paths, such as a fluid flow path for use as part of a thermal management system.

BACKGROUND

Many thermal designs, such as thermal management systems or devices, may benefit from heat transfer coefficient (HTC) enhancement, for example, through interruption of the thermal boundary layer. However, some designs or applications cannot afford the flow pressure loss associated with conventional turbulators or other features, which typically introduce bulk flow mixing. For example, conventional turbulator designs used for airfoil cooling may produce too large a pressure drop to meet backflow margin constraints. Accordingly, improvements to thermal management systems and/or features, such as heat exchangers and flow path features for enhancing heat transfer, that help overcome these issues would be useful.

BRIEF DESCRIPTION

Aspects and advantages of the invention will be set forth in part in the following description, or may be obvious from the description, or may be learned through practice of the invention.

In one exemplary embodiment of the present subject matter a flow path is provided. The flow path comprises a flow path wall defining an inner flow path surface and an asymmetric notch defined in the flow path wall. The asymmetric notch comprises a first surface and a second surface. The asymmetric notch is asymmetric about a first line extending through an intersection of the first surface with the second surface.

In another exemplary embodiment of the present subject matter a flow boundary layer restart feature is provided. The flow boundary layer restart feature comprises a first surface extending inward with respect to a flow path surface of a flow path and a second surface extending inward with respect to the flow path surface. The second surface is asymmetric with respect to the first surface such that the first surface and the second surface define an asymmetric notch.

In yet another exemplary embodiment of the present subject matter, a flow path is provided. The flow path comprises a flow path wall defining a flow path surface and an asymmetric notch defined in the flow path wall. The asymmetric notch comprises a flow expansion angle and a flow contraction angle. Each of the flow expansion angle and the flow contraction angle are measured with respect to the flow path surface. Further, the flow expansion angle and the flow contraction angle are unequal.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 9A and 9B are close-up cross-sectional views taken along the line 9A-9A and 9B-9B of FIG. 4A, respectively, providing alternate views of a wall flow boundary layer restart feature including an asymmetric notch comprising asymmetric concave surface curvature, according to an exemplary embodiment of the present subject matter.

DETAILED DESCRIPTION

Figure 1A:
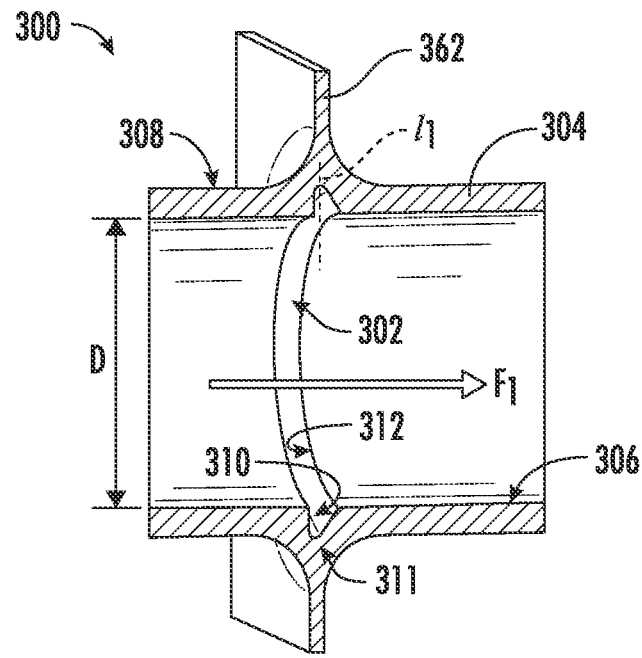
FIGS. 1A and 1B are cross-section views of a portion of a flow path having an asymmetric notch, with fluid flowing along the flow path from left to right in FIG. 1A and from right to left in FIG. 1B, according to exemplary embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations.

As used herein, the terms "first," "second," and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 25 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the figures, FIG. 1 provides a cross-section view of a portion of a flow path, such as may be used with thermal systems requiring heat transfer enhancement. The flow path may be applicable to heat exchangers, turbine cooling supply systems, refrigeration equipment, furnaces, electric machinery, electronics, avionics, or other such systems requiring heat transfer enhancement. Further, the flow path described herein may be useful for airfoil cooling where conventional turbulator designs produce too large a pressure drop to meet backflow margin constraints. Other applications of the present subject matter also may occur to those having ordinary skill in the art.

As shown in the figures, the exemplary flow path 300 for a flow of fluid F comprises an asymmetric flow boundary layer restart feature 302, which is configured as an asymmetric notch 302. The asymmetric boundary layer restart feature or notch 302 may act as a flow trip that interrupts the thermal boundary layer without bulk flow mixing. Thus, the asymmetric notch 302 may provide heat transfer coefficient (HTC) enhancement while minimizing flow pressure loss, i.e., minimizing a pressure drop $\Delta P$ in the fluid flow.

Figure 1B:
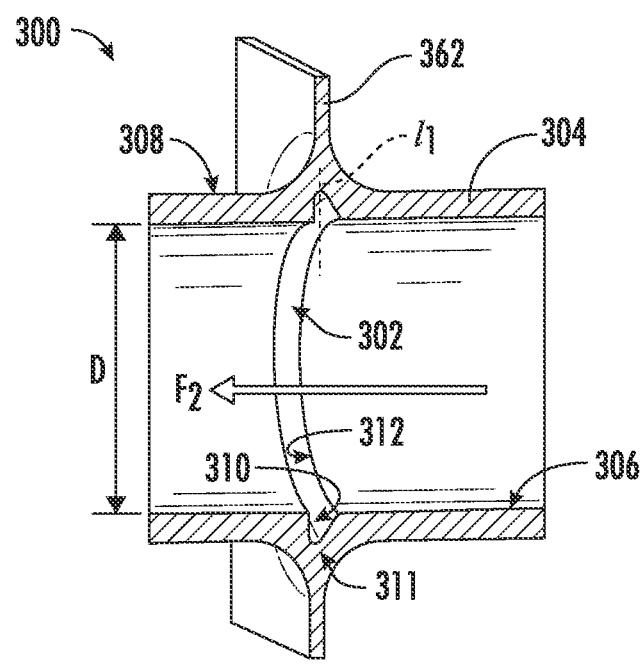
Figure 2:
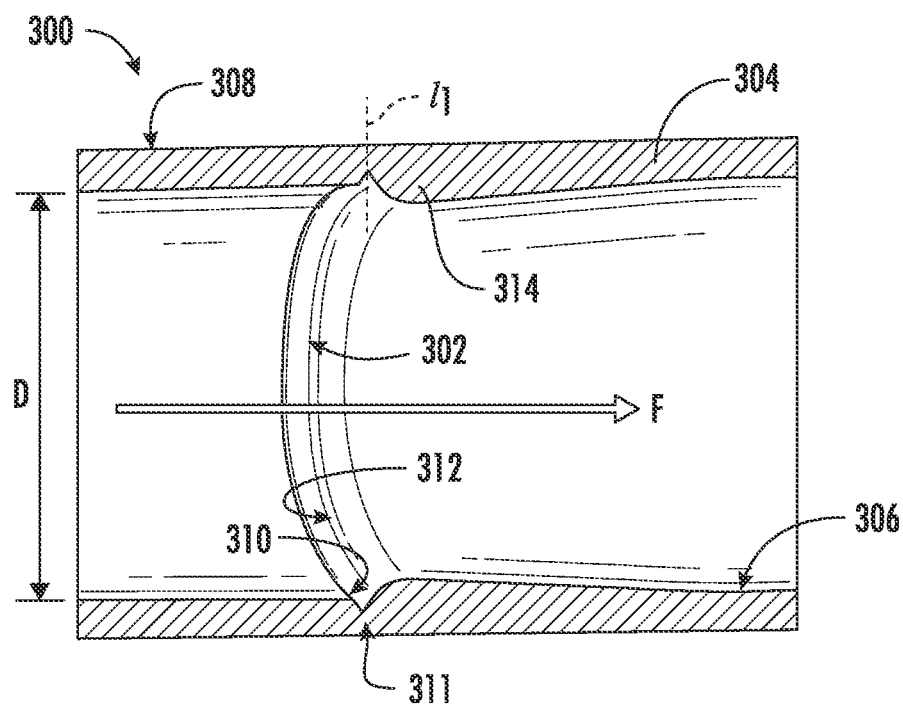
FIG. 2 is a cross-section view of a portion of a flow path having an asymmetric notch, with fluid flowing along the flow path from left to right, according to another exemplary embodiment of the present subject matter.

Referring particularly to FIGS. 1A, 1B, and 2, a cross-sectional view is provided of the flow path 300, with the cross-section taken through the asymmetric notch 302, according to exemplary embodiments of the present subject matter. As shown in FIGS. 1A, 1B, and 2, the flow path 300 includes a flow path wall 304 that defines an inner flow path surface 306. In FIG. 1A, the fluid F flows along a first flow direction, indicated by the arrow labeled $F_1$, and in FIG. 1B, the fluid F flows along a second flow direction, indicated by the arrow labeled $F_2$. It will be appreciated that the flow path 300 depicted in FIGS. 1A and 1B is the same, but the flow direction $F_1$ of the fluid F in FIG. 1A is opposite from the flow direction $F_2$ of the fluid F in FIG. 1B. Because the asymmetric notch 302 is asymmetric, e.g., not symmetrical about a first line h drawn perpendicular to a diameter or other characteristic dimension D of the flow path wall 304, the asymmetric notch 302 may affect the flow of fluid F differently depending on the flow direction $F_1$, $F_2$. That is, the flow of fluid F will not encounter identical feature geometry when the flow direction is reversed from flow direction $F_1$ to flow direction $F_2$ or from flow direction $F_2$ to flow direction $F_1$.

In the depicted embodiments, the asymmetric notch 302 is defined in the flow path wall 304, extending into the flow path wall 304 from the inner flow path surface 306; thus, the asymmetric notch 302 may be referred to as a wall-embedded notch. More particularly, the asymmetric notch 302 extends from the inner flow path surface 306 toward an outer surface 308 of the flow path wall 304. The asymmetric notch 302 may be formed as an absence of material in the flow path wall 304, i.e., the asymmetric notch 302 is an opening in the flow path wall 304 where material forming the wall 304 would otherwise be, such that fluid F flowing along the flow path 300 may flow into and out of the notch 302.

As shown in the depicted exemplary embodiments, the asymmetric notch 302 comprises a first surface 310 and a second surface 312. The asymmetric notch 302 is asymmetric about a first line $l_1$ that extends through an intersection 311 of the first surface 310 with the second surface 312. Further, in the embodiment illustrated in FIG. 2, the asymmetric notch 302 includes a segment 314 having a radius $R_r$ (FIG. 5), which extends into the flow path 300 at a height $H_r$ (FIG. 5) measured with respect to the inner flow path surface 306 adjacent the first surface 310. The segment 314 may be part of or a continuation of the second surface 312, as described in greater detail below.

Figure 3:
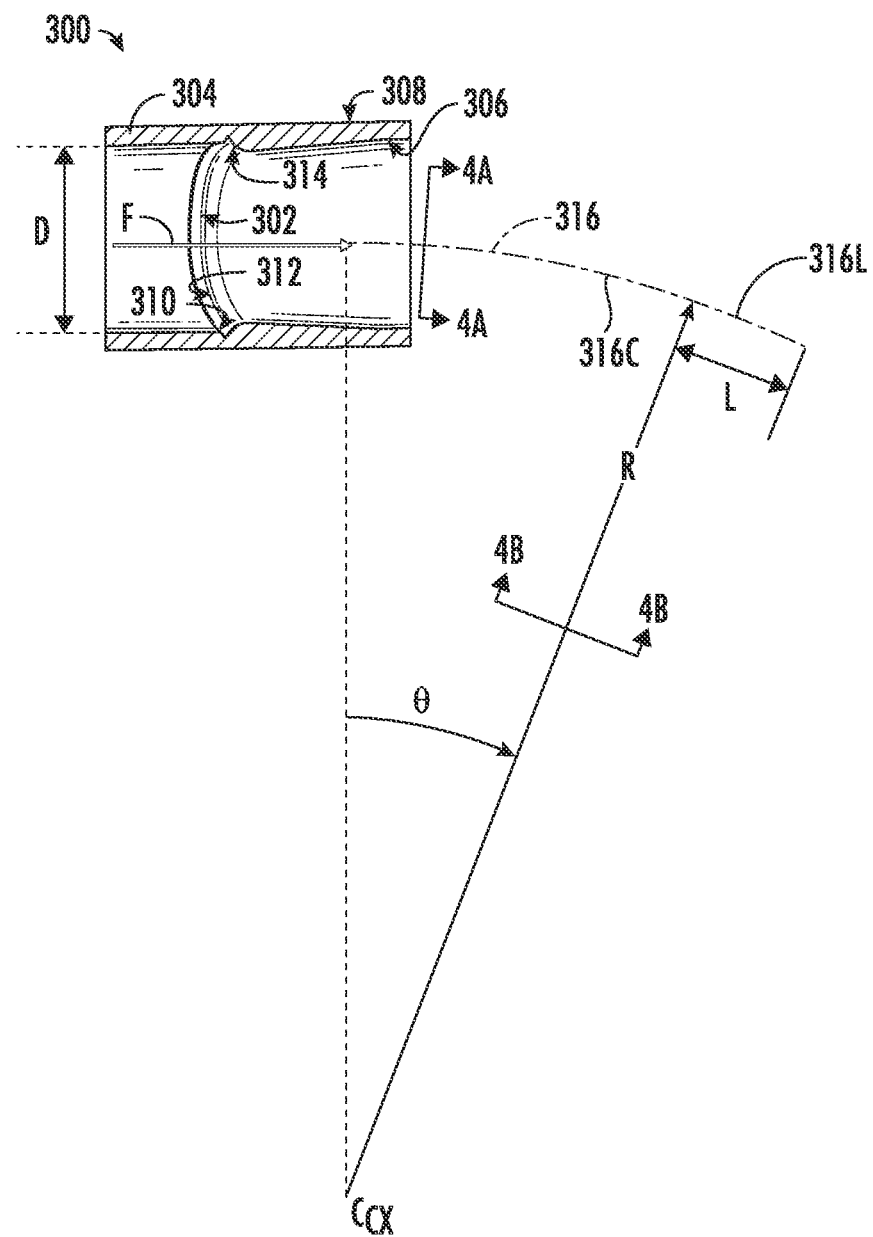
FIG. 3 is a schematic view of the flow path of FIG. 2 having a curvilinear path comprising curved and linear segments, according to an exemplary embodiment of the present subject matter.
Figure 4A:
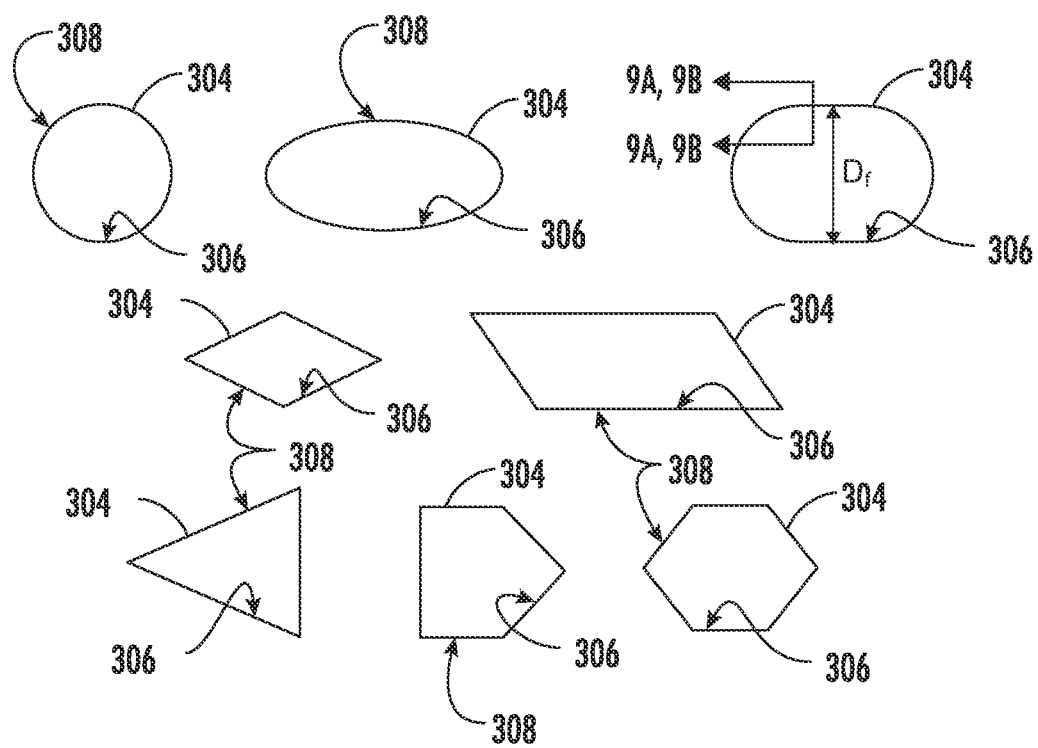
FIG. 4A is a schematic view of various cross-sectional shapes of a flow path wall defining the flow path of FIG. 2, with the cross-section taken along the line 4A-4A of FIG. 3, according to various exemplary embodiments of the present subject matter.

Referring now to FIG. 3, the flow path 300 may have various configurations. For example, the flow path 300 may comprise a generally flat or planar flow path wall 304, or the flow path 300 may comprise an annular flow path wall 304 as illustrated in FIGS. 1A, 1B, and 2. In various exemplary embodiments, the flow path wall 304 may have different cross-sectional shapes. FIG. 4A depicts various cross-sectional shapes of the flow path wall 304, for cross-sections of the flow path 300 taken along the line 4A-4A shown in FIG. 3. For instance, as depicted in FIG. 4A, the flow path wall 304 may have a generally circular cross-sectional shape, a generally elliptical cross-sectional shape, or a generally polygonal cross-sectional shape (e.g., the flow path wall 304 cross-section may have the shape of a diamond, parallelogram, triangle, pentagon, or hexagon) but the flow path wall 304 may have other cross-sectional shapes as well.

Further, the flow path 300 may be configured as a helical, spiral, or other curvilinear flow path for the flow of fluid F. In some embodiments, such as illustrated in FIG. 3, the flow path 300 may comprise a curvilinear path 316 having one or more curved segments 316C and one or more linear segments 316L. Each linear segment 316L has a length L, which may vary from one linear segment 316L to another linear segment 316L within the flow path 300 and/or may vary from one embodiment to another of the flow path 300. As shown in FIG. 3, a centerline of the curvilinear path 316 may be defined at a radial length R from a centerpoint $C_{CP}$, i.e., the curvilinear path 316 may have a radius R. In exemplary embodiments, the following relationships describe the flow path 300:

$$\frac{1}{R} \geq 0$$
$$L \geq 0$$

Figure 4B:
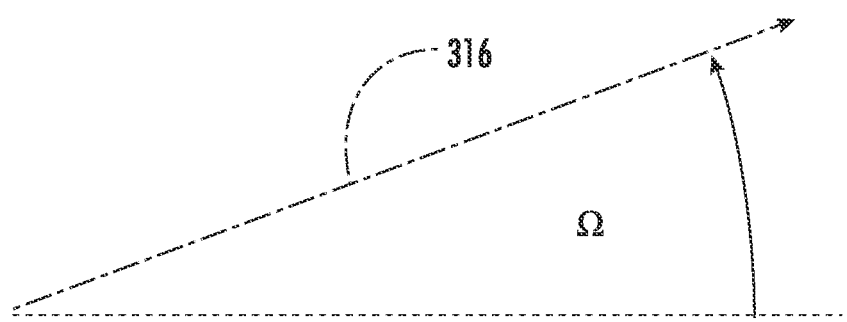
FIG. 4B is a schematic cross-section view taken along the line 4B-4B of FIG. 3, illustrating a helical pitch angle of the curvilinear path of FIG. 3, according to an exemplary embodiment of the present subject matter.

As shown in FIG. 4B, illustrating a cross-section taken along the line 4B-4B in FIG. 3, the curvilinear path 316 may have a helical pitch angle $\Omega$, and in embodiments in which the flow path 300 has a helical configuration, the helical pitch angle $\Omega$ is greater than 0°. In other embodiments, the helical pitch angle $\Omega$ is (or equals) 0°, such that the flow path 300 has a non-helical configuration, such as, e.g., a flat spiral, a generally linear configuration, or other non-helical configuration. Moreover, the flow path 300 may have an arcuate turn angle θ, which may be defined by the following relationship between a number of turns N of the curvilinear path 316 and the arc angle ω:

$$\theta = N \times \omega$$

where N>0 and ω≥0.

Figure 5:
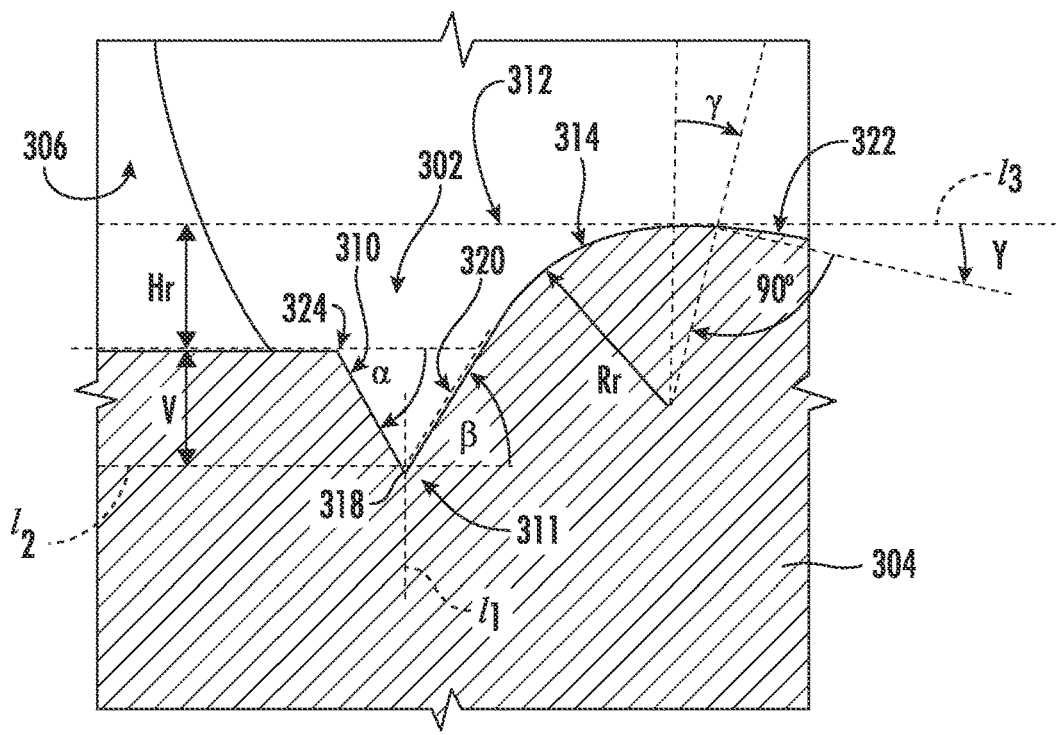
FIG. 5 is a close-up cross-sectional view of the asymmetric notch of the flow path of FIG. 2, according to an exemplary embodiment of the present subject matter.
Figure 6:
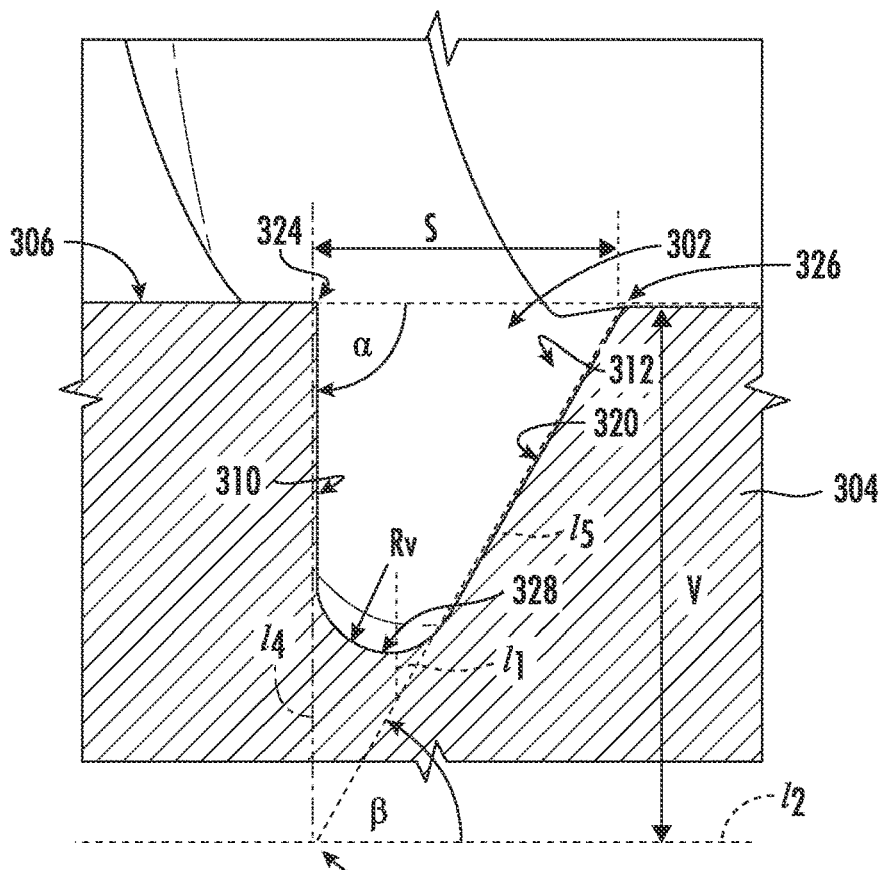
FIG. 6 is a close-up cross-sectional view of the asymmetric notch of the flow path of FIGS. 1A and 1B, according to an exemplary embodiment of the present subject matter.
Figure 7:
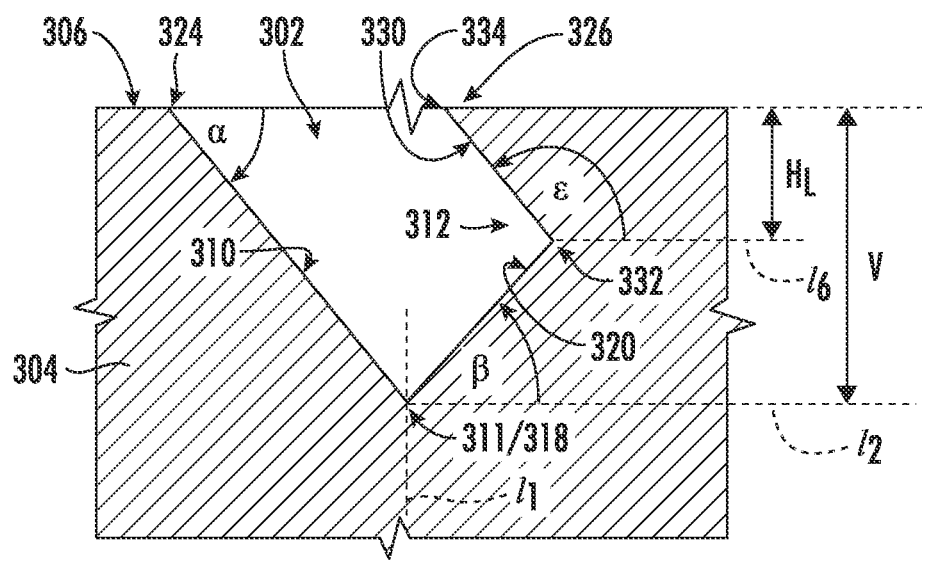
FIG. 7 is a close-up cross-sectional view of an asymmetric notch of a flow path, according to an exemplary embodiment of the present subject matter.

Turning now to FIGS. 5, 6, and 7, the asymmetric notch 302 will be described in greater detail. As previously described, the asymmetric notch 302 in the exemplary embodiment of FIG. 5 has a second surface 312, which includes a segment 314 having a radius $R_r$ and a height $H_r$ with respect to the inner flow path surface 306 adjacent the first surface 310. The segment 314 may be referred to as a radiused segment of the second surface 312. Moreover, the asymmetric notch 302 has a depth V defined from the inner flow path surface 306 adjacent the first surface 310.

As illustrated in FIG. 5, the first surface 310 is at a first angle α defined with respect to the inner flow path surface 306, and the second surface 312 at a second angle β defined with respect to a second line $l_1$, which is tangent to a deepest point or bottom 318 of the asymmetric notch 302 and parallel to the inner flow path surface 306. In the depicted embodiment, the first surface 310 and the second surface 312 meet at the bottom 318 of the asymmetric notch 302; thus, the second line $l_1$ is tangent to the intersection of the first surface 310 and the second surface 312. It will be appreciated that the "bottom" of the asymmetric notch 302 may refer to a point, line, etc. of the asymmetric notch 302 farthest from the flow path surface where the asymmetric notch 302 begins, and the point, line, etc. at the flow path surface where the asymmetric notch 302 begins may be referred to as the "top" of the asymmetric notch 302. For instance, in the embodiment depicted in FIG. 5, the notch bottom 318 is the portion of the asymmetric notch 302 farthest from the inner flow path surface 306.

Further, in the exemplary embodiment of FIG. 5, the first surface 310 is upstream of the second surface 312, i.e., the flow direction of fluid F is from left to right, and the radiused segment 314 is immediately downstream of a first planar segment 320 of the second surface 312 that intersects the first surface 310 at the notch bottom 318. More particularly, the second surface 312 transitions from the first planar segment 320 to the radiused segment 314 along the flow direction of fluid F. In the depicted embodiment, immediately downstream of the radiused segment 314, the second surface 312 transitions to a second planar segment 322; that is, along the flow direction, the second surface 312 transitions from the first planar segment 320 to the radiused segment 314 and from the radiused segment 314 to the second planar segment 322. The first planar segment 320 is defined at the second angle β with respect to the second line $l_2$, and the second planar segment 322 is defined at a third angle γ with respect to a third line $l_3$, which is tangent to the radiused segment 314. As shown, the third angle γ defines a slope from the peak of the radiused segment 314 back to the inner flow path surface 306.

In exemplary embodiments, several parameters may define the geometry of the asymmetric notch 302. For example, a ratio of the height $H_r$ of the radiused segment 314 to the flow path diameter or characteristic dimension D (FIG. 2) may be within the following range:

$$0 \leq H_r:D \leq 1:20$$

Stated differently, the ratio of the height $H_r$ of the radiused segment 314 to the flow path diameter or characteristic dimension D (FIG. 2) may be within a range from zero to 1:20. In some embodiments, the ratio $H_r$:D may be within a range from zero to 1:10. Further, for the embodiment shown in FIG. 5, the radius $R_r$ of the radiused segment 314 is greater than zero (0). As will be described in greater detail herein, the height $H_r$ and the radius $R_r$ may each be equal to zero (0) to produce other embodiments of the asymmetric notch 302, such as the asymmetric notch 302 illustrated in FIGS. 1A and 1B, which does not have a radiused segment 314.

Moreover, in exemplary embodiments, the third angle γ may be within the following range:

$$0° \leq \gamma \leq 20°$$

That is, the third angle γ may be greater than or equal to 0° and less than or equal to 20°. In some embodiments, the third angle γ may be greater than or equal to 0° and less than or equal to 10°. Additionally or alternatively, for embodiments in which the absolute value of the first angle α is greater than 0° and less than 90°, the following relationship also describes the asymmetric notch 302:

$$1 \leq \frac{\tan|\alpha| + \tan\beta}{\tan|\alpha| \times \tan\beta} \leq 230$$

That is, in exemplary embodiments, if $0°<|\alpha|<90°$, then the ratio of the sum of $\tan(|\alpha|)$ and $\tan(\beta)$ (i.e., the tangent of the absolute value of the first angle $\alpha$ and the tangent of the second angle $\beta$) to the product of $\tan(|\alpha|)$ and $\tan(\beta)$ is within a range from one (1) to two hundred and thirty (230), inclusive. In some embodiments, if $0°<|\alpha|<90°$, then the ratio of the sum of $\tan(|\alpha|)$ and $\tan(\beta)$ to the product of $\tan(|\alpha|)$ and $\tan(\beta)$ is within a range from one (1) to nineteen (19), inclusive. In other embodiments, if $0°<|\alpha|<90°$, then the ratio of the sum of $\tan(|\alpha|)$ and $\tan(\beta)$ to the product of $\tan(|\alpha|)$ and $\tan(\beta)$ is within a range from one (1) to two (2), inclusive. Further, if the first angle $\alpha$ is $0°$, then the second angle $\beta$ is greater than $0°$ and less than or equal to $90°$; that is, if $\alpha=0°$, then $0°<\beta\leq90°$.

Referring now to FIG. 6, when certain parameters of the exemplary asymmetric notch 302 of FIG. 5 are collapsed or go to zero (0), the asymmetric notch 302 may be configured as shown in the exemplary embodiment of FIG. 6. More particularly, for embodiments in which the height $H_r$ and radius $R_r$ of the radiused segment 314 and the third angle $\gamma$ are each equal to zero (0), the second surface 312 of the asymmetric notch 302 comprises only the first planar surface 320, i.e., the second surface 312 of the embodiment of FIG. 6 does not include the radiused segment 314 or the second planar surface 322. Stated differently, where $H_r=0$, $R_r=0$, and $\gamma=0°$, the asymmetric notch 302 may have a configuration such as depicted in FIG. 6, with no radiused portion extending above the inner flow path surface 306.

As also illustrated in FIG. 6, the asymmetric notch 302 has a span S. The span S may be measured from an intersection or junction 324 between the inner flow path surface 306 and the first surface 310 to an intersection or junction 326 between the second surface 312 and the inner flow path surface 306. The span S may be an indication of how wide or narrow is the opening of the asymmetric notch 302 with respect to the inner flow path surface 306.

Further, as described with respect to the embodiment of FIG. 5, the asymmetric notch 302 has a depth V. In the exemplary embodiment of FIG. 6, however, the asymmetric notch 302 has a radius $R_v$, such that the first surface 310 and the second surface 312 do not meet at a relatively sharp corner. Instead, a radiused portion 328, having the radius $R_v$, extends from the first surface 310 to the second surface 312. In other embodiments, the first surface 310 and the second surface 312 may intersect sharply at the bottom 318 of the asymmetric notch 302, e.g., as shown by the intersection of the fourth and fifth lines $l_4$, $l_5$. Nevertheless, including the radiused portion 328 having the radius $R_v$ may, e.g., help the fluid F flow with respect to the asymmetric notch 302 and/or make it easier to manufacture the flow path 300 having the asymmetric notch 302, e.g., using an additive manufacturing process as described herein.

Figure 8:
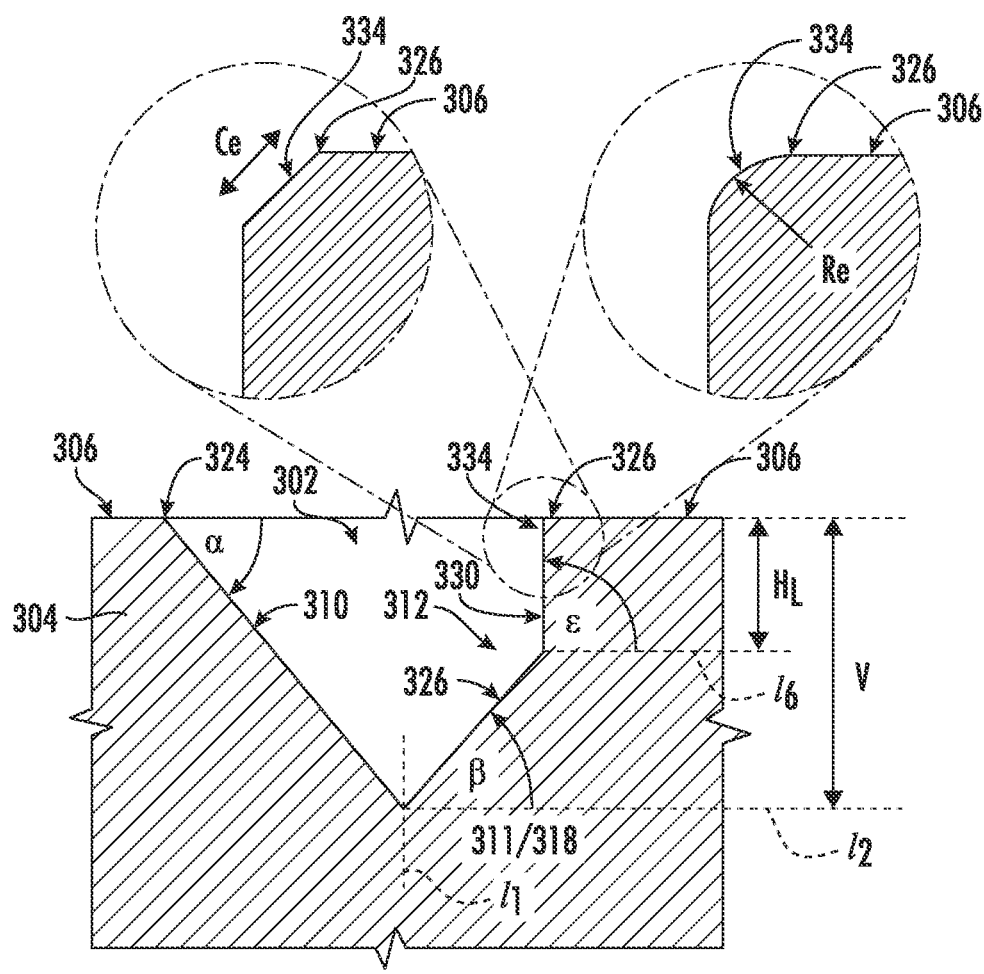
FIG. 8 is the close-up cross-sectional view of the asymmetric notch of FIG. 7, providing alternate views of an edge of the asymmetric notch, according to various exemplary embodiments of the present subject matter.

Referring now to FIGS. 7 and 8, other configurations of the asymmetric notch 302 will be described, according to exemplary embodiments of the present subject matter. As illustrated in FIGS. 7 and 8, the second surface 312 may comprise a ledge segment 330 adjacent the first planar segment 320. The ledge segment 330 may have a height $H_l$ measured from the inner flow path surface 306 to an intersection 332 between the ledge segment 330 and the first planar segment 320 of the second surface 312. Further, the ledge segment 330 may be a fourth angle $\varepsilon$ defined from a sixth line $l_6$, which extends through the intersection 332 between the first planar and ledge segments 320, 330 parallel to the inner flow path surface 306, to the ledge segment 330. In exemplary embodiments, the absolute value of the first angle $\alpha$ may be less than or equal to the second angle $\beta$, i.e., $|\alpha|\leq\beta$, and the asymmetry of the asymmetric notch 302 may be established at least in part by the ledge segment 330, which has a height $H_l$ less than the notch depth V. In some embodiments, such as illustrated in FIG. 7, where the first surface 310 is parallel to the ledge segment 330, the following relationship also may be established between the first angle $\alpha$ and the fourth angle $\varepsilon$:

$$180°-|\alpha|=\varepsilon\geq90°$$

Stated differently, the fourth angle $\varepsilon$ may be greater than or equal to $90°$ and equal to the difference of $180°$ and the absolute value of the first angle $\alpha$.

In some embodiments where the first surface 310 is not parallel to the ledge segment 330, the fourth angle $\varepsilon$ is independent of the first angle $\alpha$ such that the following limit range may be established for the fourth angle $\varepsilon$:

$$180°\geq\varepsilon\geq90°$$

Stated differently, the fourth angle $\varepsilon$ may be greater than or equal to $90°$ and less than or equal to $180°$ in those embodiments where the first surface 310 is not parallel to the ledge segment 330.

Turning to FIG. 8, in some embodiments, the fourth angle $\varepsilon$ may be a right angle, i.e., $\varepsilon=90°$, and the first angle $\alpha$ and the second angle $\beta$ may be equal, e.g., $|\alpha|=\beta=45°$. In such embodiments, an edge 334 of the ledge segment 330, which defines the intersection 326 of the second surface 312 of the asymmetric notch 302 with the inner flow path surface 306, may be sharp, chamfered, or radiused. More particularly, the edge 334 may be a sharp, generally right angle as shown in the lower image, have a chamfer with a length $C_e$ as shown in the upper left image, or have a radius $R_e$ as shown in the upper right image. The chamfer length $C_e$ may be within a range from zero (0), i.e., no chamfer, up to a value corresponding to the ledge segment height $H_l$, and the radius $R_e$ may be with a range from zero (0), i.e., no radius, up to a value corresponding to the ledge segment height $H_l$. That is, in some embodiments, $0\leq C_e\leq H_l$ and $0\leq R_e\leq H_l$.

Referring now to FIGS. 9A and 9B, embodiments of the asymmetric notch 302 applicable to non-circular flow passages or features will be described in greater detail. As shown in FIGS. 9A and 9B, an oval implementation or configuration of a notch-type boundary layer restart feature 336 is provided. In the depicted exemplary embodiment, the feature 336 has diameter or characteristic dimension $D_f$ (FIG. 4A), and the asymmetric notch 302 comprises asymmetric concave surface curvature. More particularly, referring to FIGS. 9A and 9B, the asymmetric notch 302 has a span S that changes along the wetted perimeter of the feature 336. As shown, the span S may be measured linearly from the first surface 310 to the second surface 312 of the asymmetric notch 302. In various embodiments, the span S is greater than or equal to zero (0), i.e., $S\geq0$. Further, as shown most clearly in FIGS. 9A and 9B, the orientation of the edges 338 of the asymmetric notch 302 may be non-perpendicular with respect to the bulk fluid flow direction F.

As illustrated in FIGS. 9A and 9B, the asymmetric concave surface curvature of the asymmetric notch 302 may comprise a first radius $R_1$ and a second radius $R_2$. In the region of the asymmetric notch 302 depicted in the cross-sectional view of FIG. 9A, the first radius $R_1$ is greater or larger than the second radius $R_2$, i.e., $R_1>R_2$. Similarly, in the region of the asymmetric notch 302 depicted in the cross-sectional view of FIG. 9B, the first radius $R_1$ is less or smaller than the second radius $R_2$, i.e., $R_2>R_1$. It will be appreciated that the embodiments illustrated in FIGS. 9A and 9B also may be described in terms of the parameters used above, e.g., with respect to FIGS. 5-8. That is, the embodiments of FIGS. 9A and 9B may be described using parameters that include the notch depth V, the first and second angles α, β, the heights $H_r$, $H_l$, etc., which vary over the feature to produce the illustrated asymmetric concave surface curvature.

Figure 11:
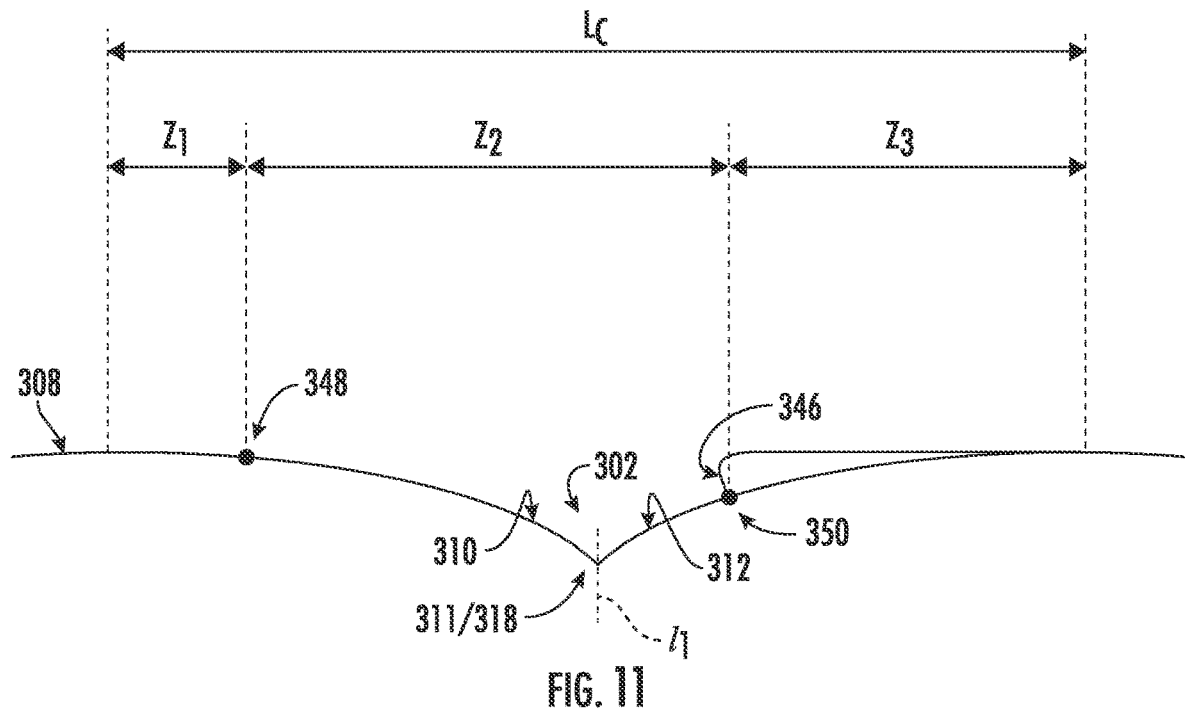
Figure 12:
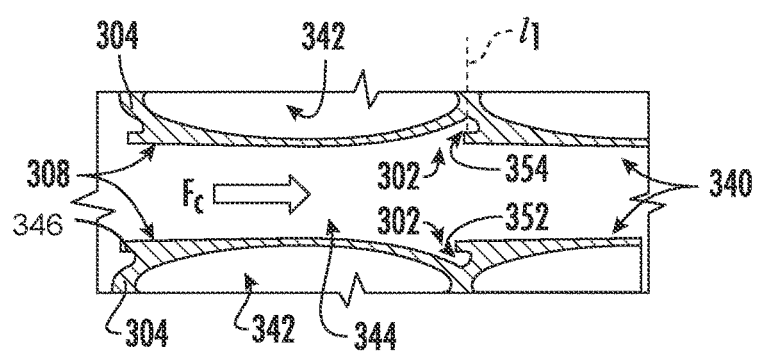
Figure 13:
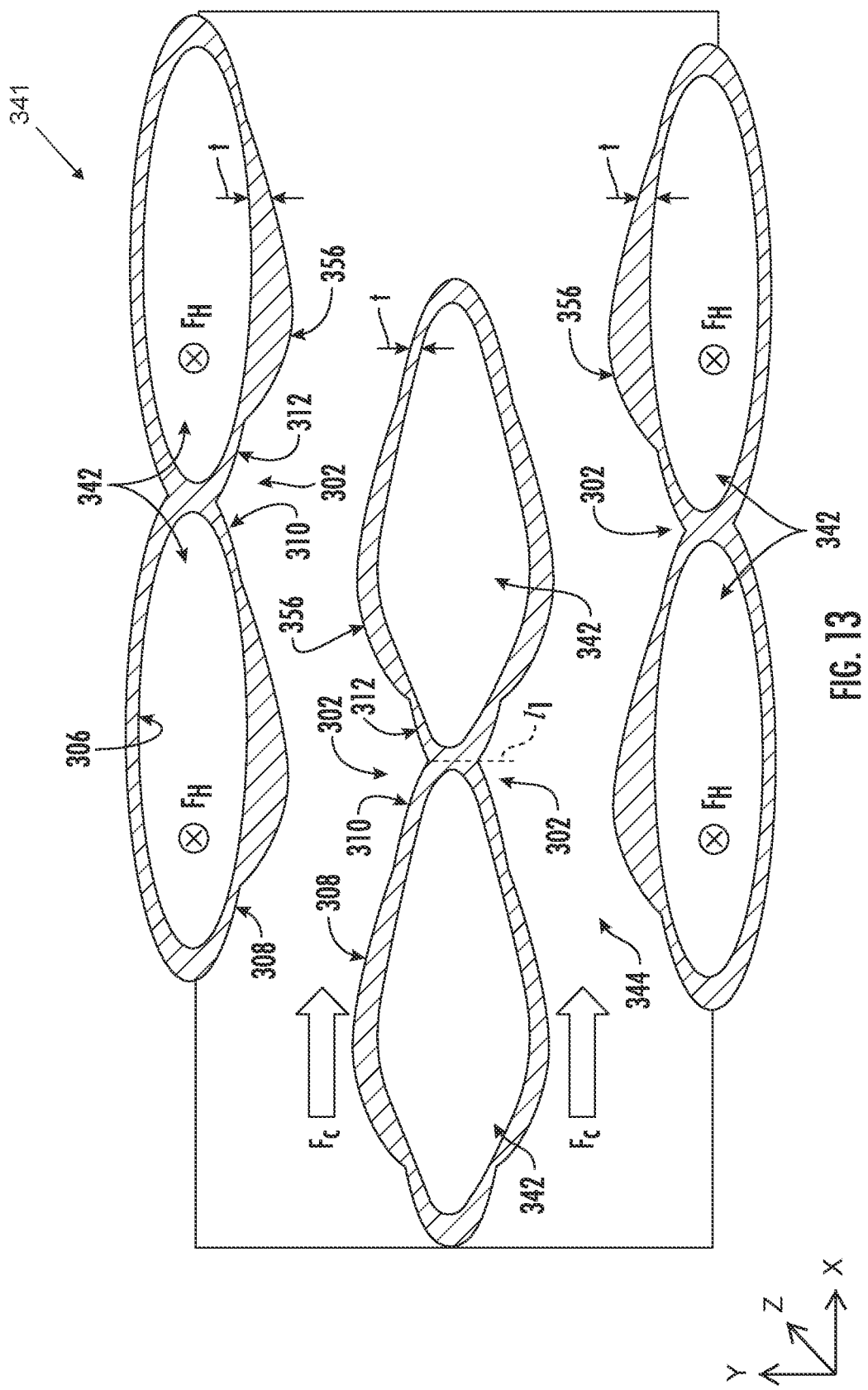

Turning now to FIGS. 10 through 13, rather than the concave surface curvature as shown in FIGS. 9A and 9B, a notch-type boundary layer restart feature may comprise asymmetric convex surface curvature. As illustrated in FIGS. 10 through 13, the asymmetric notch 302 defined by the flow path wall 304 may be defined at the outer surface 308 of the flow path wall 304. More specifically, the flow path 300 may comprise hybrid asymmetric elliptical tubes 340 that share the flow path wall 304 as a common wall, e.g., to reduce weight of the flow path 300, etc. That is, the flow path wall 304 defines each tube 340 of a plurality of adjacent tubes 340. As shown, e.g., in FIG. 10, the tubes 340 define a first flow path portion 342 for the flow of a first fluid, such as a hot fluid $F_H$, within the tubes 340 and a second flow path portion 344 for the flow of a second fluid, such as a cold fluid $F_C$, over the outer surface 308 of the tubes 340. Accordingly, the flow path 300 may define a heat exchanger for the exchange of heat between a hot fluid $F_H$ and a cold fluid $F_C$. For example, the plurality of tubes 340 together may form a heat exchanger body 341. In some embodiments, the heat exchanger body 341 may be asymmetric about at least two orthogonal axes, such as the Y and Z axes as illustrated in FIG. 13, which includes the X, Y, and Z axes that are orthogonal to one another.

As previously stated, the asymmetric notch 302 is defined by the outer surface 308, which is a flow path surface in the embodiments of FIGS. 10 through 13 like the inner flow path surface 306. As such, the asymmetric notch 302 may be a boundary layer restart feature for the flow of the cold fluid $F_C$. Further, the outer surface 308 at one tube 340 may define the first surface 310 of the asymmetric notch 302, and the outer surface 308 at an adjacent tube 340 may define the second surface 312 of the asymmetric notch 302. In the depicted embodiment, the adjacent tubes 340 are linearly adjacent to one another along the flow direction of the second or cold fluid $F_C$.

Figure 10:
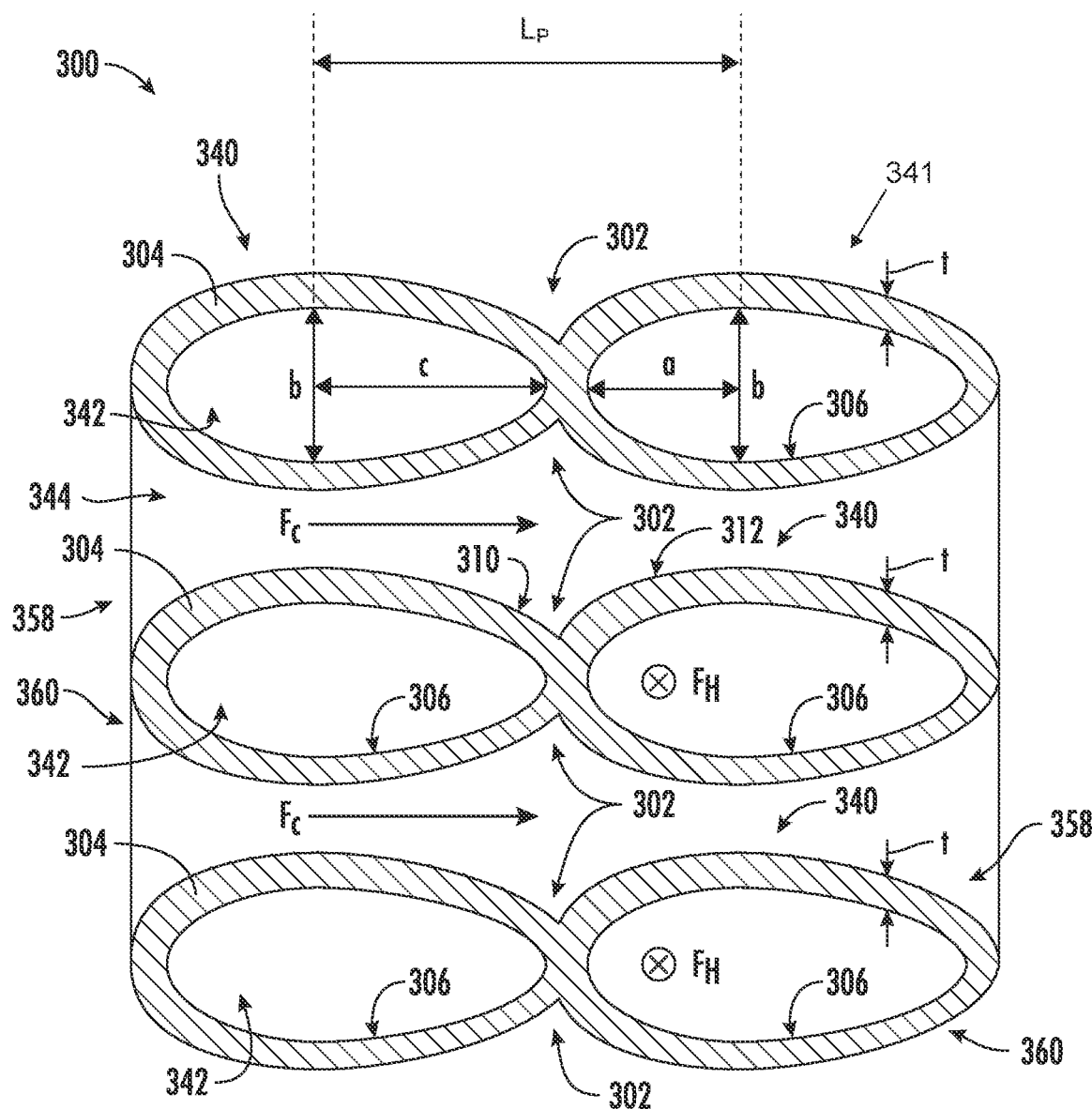
FIGS. 10 through 13 are schematic cross-section views of a flow path having asymmetric convex surface curvature defining the asymmetric notch, according to exemplary embodiments of the present subject matter.

Referring particularly to FIG. 10, each asymmetric elliptical tube 340 comprises a forward major semi-axis having a length a, a forward minor axis having a length b, and an aft major semi-axis having a length c. Further, the tube 340 has a tube wall thickness t. It will be appreciated that each tube 340 may be configured to have a constantly varying curvature over the outer surface 308. Further, a pitch length $L_P$ from the forward minor axis of a tube 340 to an adjacent tube 340 is equal to the sum of the aft major semi-axis length c, the tube wall thickness t, and the forward major semi-axis length a, i.e., $L_P$=c+t+a. The pitch length $L_P$ also denotes a cycle length for embodiments having a plurality of adjacent tubes 340 defining a plurality of asymmetric notches 302. Moreover, in exemplary embodiments, the flow path 300 is configured such that the following relationship is established:

$$5 \geq \frac{c}{b} > \frac{a}{b} \geq \frac{1}{2}$$

FIG. 12 provides a schematic view of another configuration of a notch-type boundary layer restart feature comprising asymmetric convex surface curvature, according to an exemplary embodiment of the present subject matter. As shown in FIG. 12, the asymmetric notch 302 may comprise a ledge segment 346 similar to the ledge segment 330 illustrated in FIGS. 7 and 8. More particularly, the ledge segment 346 may introduce asymmetry into the convex surface notch, e.g., when the tubes 340 are not asymmetric elliptical tubes but are elliptical tubes, or may enhance the asymmetry of the asymmetric notch 302. In some embodiments, the ledge segment 346 may have parameters similar to the ledge segment 330, e.g., the ledge segment 346 may have a height $H_l$, may be defined at the fourth angle ε, and may have a sharp, chamfered (with a length $C_e$), or radiused (with a radius $R_e$) edge that intersects the outer flow path surface 308. It will be appreciated that the ledge segment 346 may be formed as part of the flow path wall 304 that defines the tubes 340 and is common to adjacent tubes 340, as described with respect to FIG. 10.

As illustrated in FIG. 11, various zones may be defined with respect to the fluid flow for the depicted flow path 300. In a first zone $Z_1$ and a third zone $Z_3$, a very high heat transfer coefficient (HTC) is established. Between the first and third zones $Z_1$, $Z_3$, a second zone $Z_2$ has a low HTC. The second zone $Z_2$ is generally defined from a point 348 of flow separation (e.g., cold flow separation for embodiments in which the fluid is the cold fluid $F_C$), where a free stream condition begins, to a point 350 where the flow boundary layer restarts. Thus, the second zone $Z_2$ of the depicted embodiment encompasses the asymmetric notch 302.

A cyclic length $L_C$ may be defined from the start of the first zone $Z_1$ to the end of the third zone $Z_3$. It will be appreciated that the flow path 300 may comprise a plurality of asymmetric notches 302 along the flow direction of the second or cold fluid $F_C$, defining a cyclical cascade of boundary layer restarts along the flow. As such, the cyclic length $L_C$ is the length of each cycle of a boundary layer restart. A cyclic length $L_C$ may be defined for any embodiment of the flow path 300 comprising a plurality of asymmetric notches 302 that are evenly spaced apart from one another.

FIG. 12 provides a schematic view of still another configuration of a notch-type boundary layer restart feature comprising asymmetric convex surface curvature, according to an exemplary embodiment of the present subject matter. Like the embodiment of FIG. 11, the embodiment of the flow path 300 illustrated in FIG. 12 comprises an asymmetric notch 302 with a ledge segment 346. However, the ledge segment 346 in the embodiment of FIG. 12 comprises an inward fillet, undercut, or groove 352 or the like such that a portion of the material that would otherwise form the ledge segment 346. Such removal of the material may reduce the weight of the flow path 300 and, thereby, any system or apparatus in which the flow path 300 is used. Moreover, as illustrated in FIG. 12, the ledge segment 346 may project along the span S of the asymmetric notch 302. For example, an edge 354 of the ledge segment 346 may extend over the bottom 318 of the asymmetric notch 302, where the first surface 310 intersects the second surface 312. It will be appreciated that the ledge segment 346 may be formed as part of the flow path wall 304 that defines the tubes 340 and is common to adjacent tubes 340, as described with respect to FIG. 10.

FIG. 13 provides a schematic view of yet another configuration of a notch-type boundary layer restart feature comprising asymmetric convex surface curvature, according to an exemplary embodiment of the present subject matter. The embodiment illustrated in FIG. 13 is similar to the embodiment depicted in FIGS. 2, 3, and 5, in which the asymmetric notch 302 comprises a radiused segment 314 projecting above the inner flow path surface 306. As shown in FIG. 13, the flow path wall 304 defining the tubes 340 comprises a radiused segment 356, which projects into the flow of the second or cold fluid $F_C$. The radiused segment 356 may be downstream of the deepest part of the asymmetric notch 302 and may be part of the second surface 312. It will be appreciated that the radiused segment 356 may be configured as described with respect to the radiused segment 314, having a height $H_r$ and a radius $R_r$, and in some embodiments, a planar segment at a spatial offset angle γ may be immediately downstream of the radiused segment 314, similar to the second planar segment 322 described herein. As further illustrated in FIG. 13, the flow path of the first, hot fluid $F_H$ within the tubes 340 may be shaped complementary to the outer profile of the tubes 340 having radiused segments 356. For instance, as illustrated by the middle row of tubes 340 in FIG. 13, the tube wall has a constant thickness t such that the inner flow path is not elliptical but includes portions extending into the radiused segments 356. In other embodiments, the inner flow path may be generally elliptical notwithstanding the radiused segments 356, i.e., such that the tube wall thickness t varies along the flow direction of the second or cold fluid $F_C$. As further shown in FIG. 13, the tubes 340 may form a body that As shown, e.g., in FIGS. 10, 12, and 13, for embodiments of the flow path 300 comprising a plurality of tubes 340 and in which the asymmetric notch 302 is defined at the outer surface 308 of the flow path 300, an asymmetric notch 302 may be defined at opposite stations of each tube 340. More particularly, referring to FIG. 10, a first asymmetric notch 302 is defined along an upper portion 358 of the middle tubes 340, and a second asymmetric notch 302 is defined along a lower portion 360 of the middle tubes 340. As such, the first asymmetric notch 302 is defined opposite the second asymmetric notch 302. Asymmetric notches 302 may be similarly defined in other embodiments of the flow path 300, e.g., as illustrated in FIGS. 12 and 13.

Figure 14:
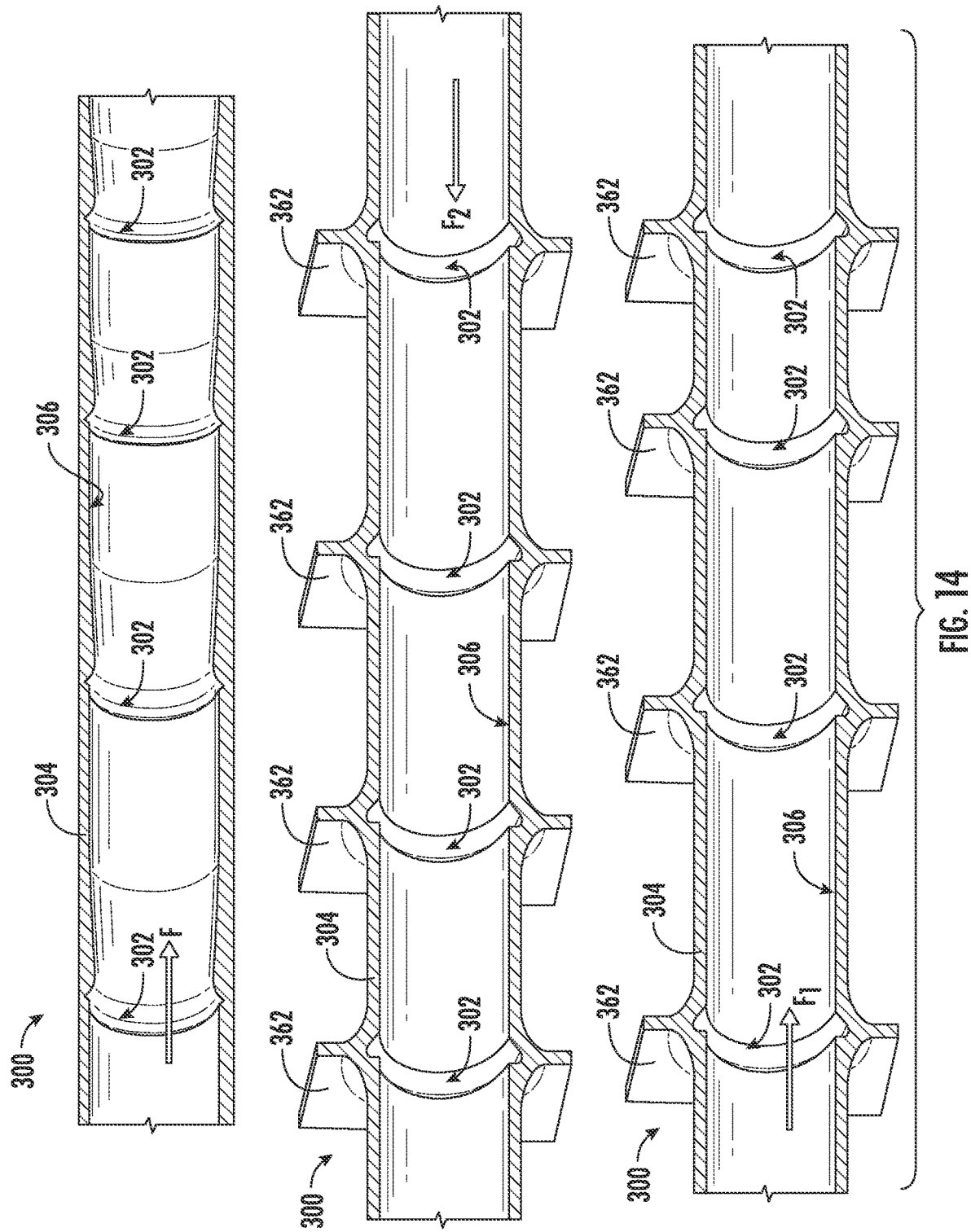
FIG. 14 provides cross-section views of various flow paths, each flow path comprising a plurality of asymmetric notches, the spacing of the plurality of asymmetric notches with respect to one another decreasing along the flow direction, according to an exemplary embodiment of the present subject matter.
Figure 15:
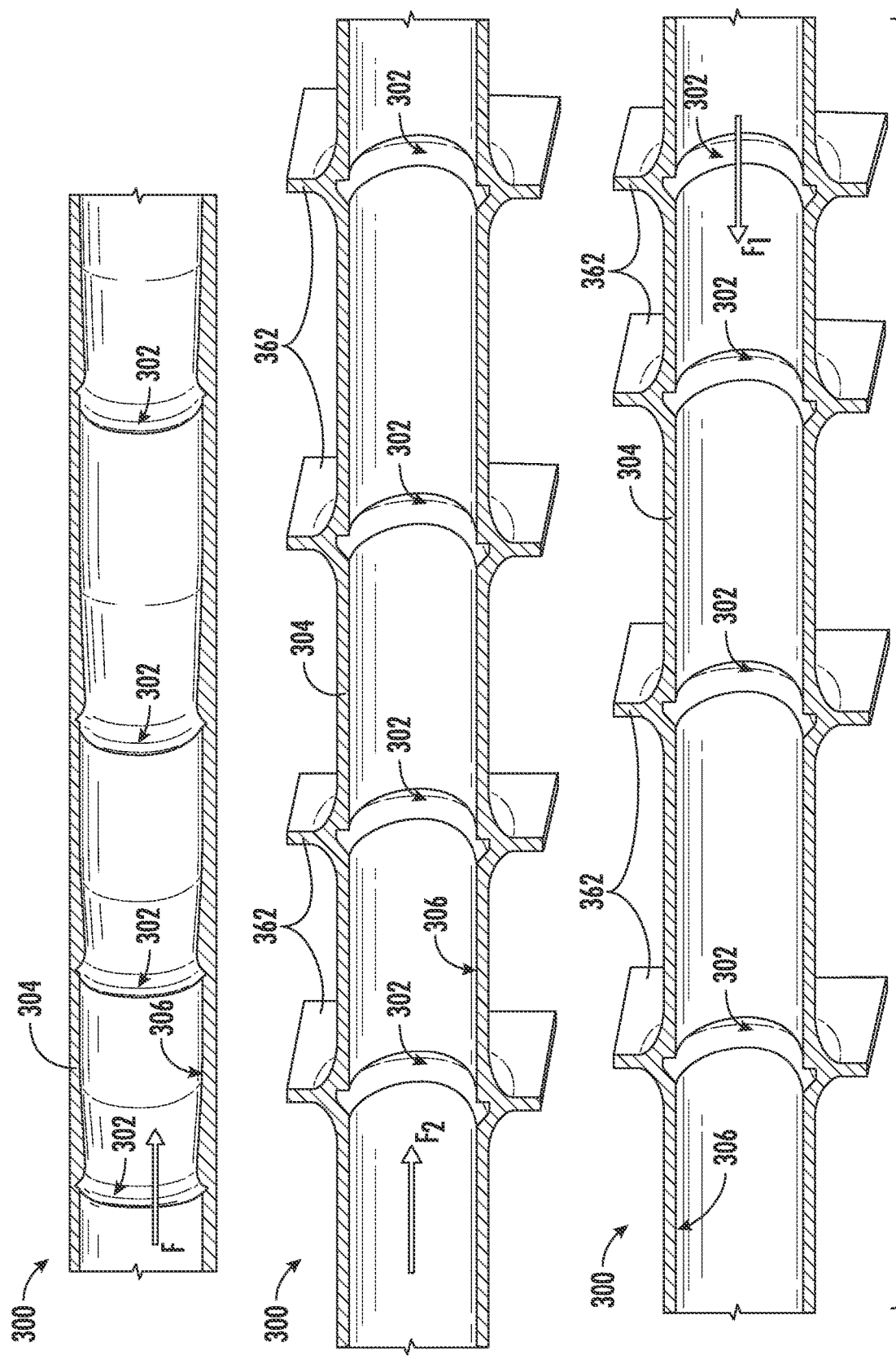
FIG. 15 provides cross-section views of various flow paths, each flow path comprising a plurality of asymmetric notches, the spacing of the plurality of asymmetric notches with respect to one another increasing along the flow direction, according to an exemplary embodiment of the present subject matter.

Turning now to FIGS. 14 through 17, various exemplary embodiments of the flow path 300 comprising a plurality of asymmetric notches 302 will be described. As shown in FIG. 14, in some embodiments, the spacing of the plurality of asymmetric notches 302 may decrease along the direction of the flow of fluid F, as indicated by the arrow labeled F. In other embodiments, as depicted in FIG. 15, the spacing of the plurality of asymmetric notches 302 may increase along the direction of the flow of fluid F, as indicated by the arrow labeled F. The spacing of the asymmetric notches 302 may be chosen based on the heat transfer requirements of a system in which the flow path 300 is used. For example, increased heat transfer may be desired at a first location along the flow path 300 than at a second location, such that more asymmetric notches 302 are included at the first location, i.e., the spacing between adjacent asymmetric notches 302 is less at the first location than at the second location. Thus, as shown in FIGS. 14 and 15, the plurality of asymmetric notches 302 may be unevenly spaced along the flow path wall 304. That is, the plurality of asymmetric notches 302 may be implemented in the flow path 300 in a non-uniform pitch, e.g., to optimize the in-conduit or flow path heat transfer to external heat transfer conditions.

Figure 16:
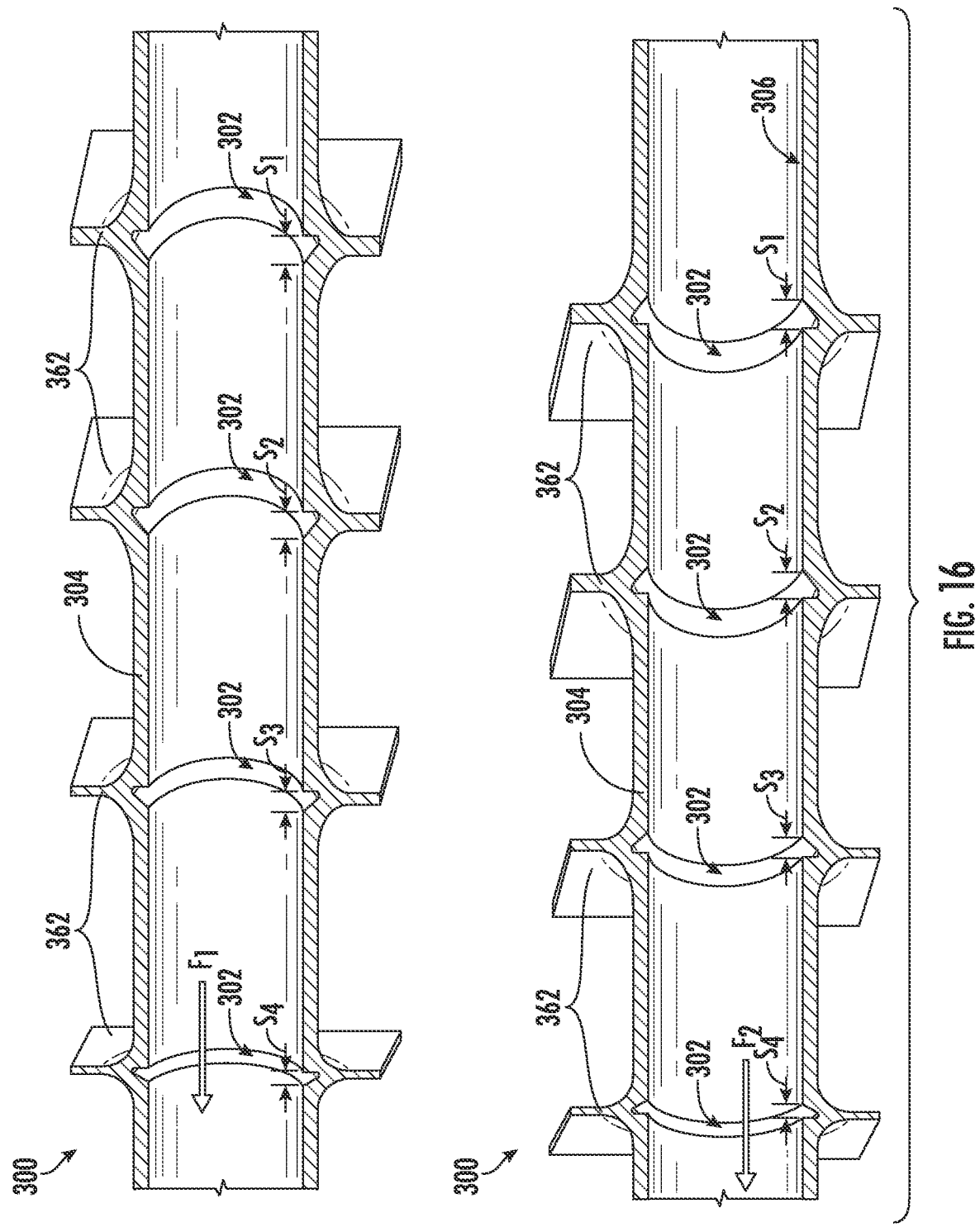
FIG. 16 provides cross-section views of various flow paths, each flow path comprising a plurality of asymmetric notches, a span of the plurality of asymmetric notches decreasing along the flow direction, according to an exemplary embodiment of the present subject matter.
Figure 17:
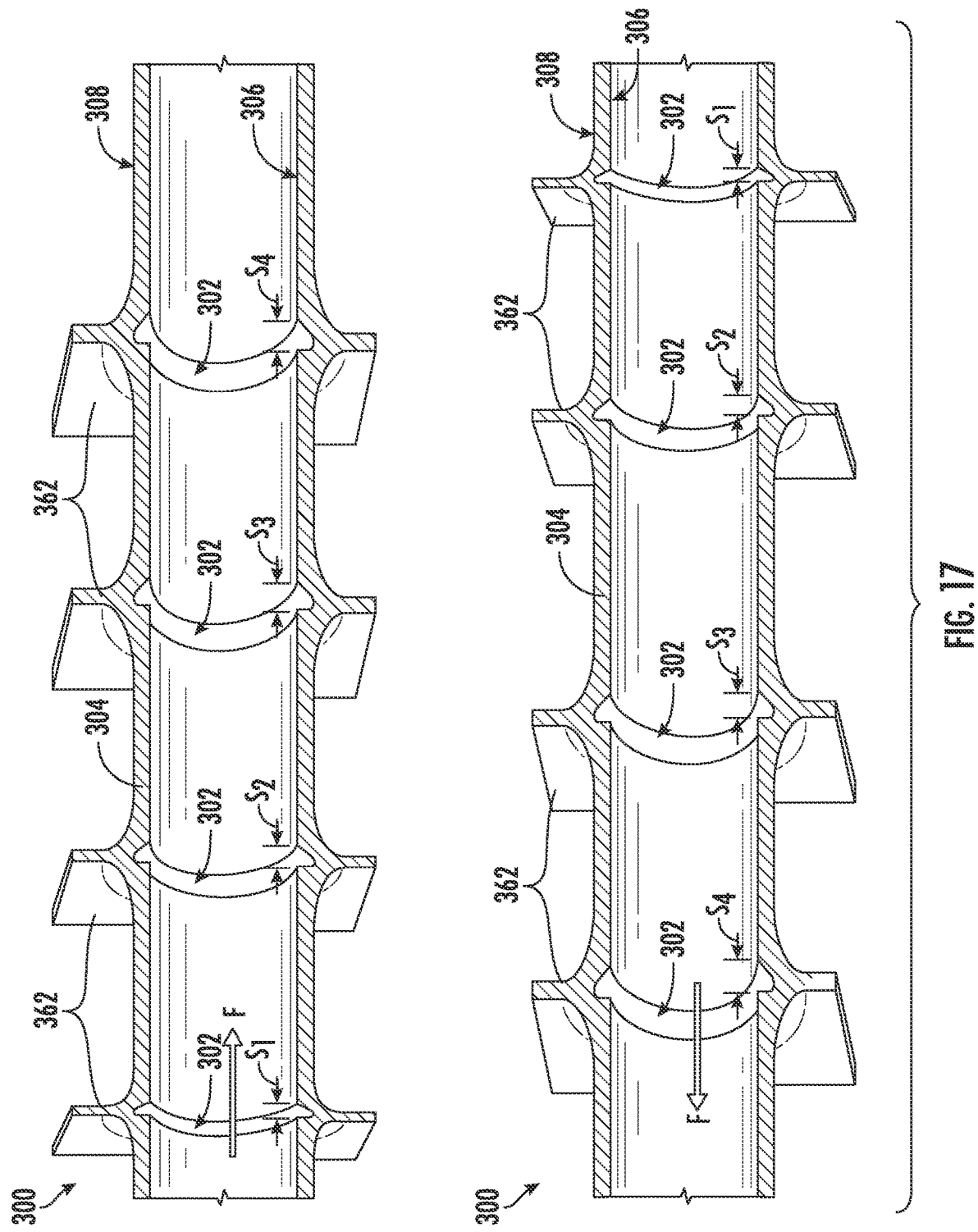
FIG. 17 provides cross-section views of various flow paths, each flow path comprising a plurality of asymmetric notches, a span of the plurality of asymmetric notches increasing along the flow direction, according to an exemplary embodiment of the present subject matter.

As illustrated in FIG. 16, in further embodiments, a dimension of the asymmetric notch 302, such as the span S as illustrated, may decrease for each asymmetric notch 302 of a plurality of asymmetric notches 302 along the direction of the flow of fluid F, as indicated by the arrow labeled F. For instance, in the depicted embodiment, a first span $S_1$ is greater or larger than adjacent second span $S_2$, which is greater or larger than adjacent span $S_3$, which is greater or larger than adjacent span $S_4$. In other embodiments, as depicted in FIG. 17, the dimension of the asymmetric notch 302, such as the span S as illustrated, may increase for each asymmetric notch 302 of a plurality of asymmetric notches 302 along the direction of the flow of fluid F, as indicated by the arrow labeled F. For example, in the depicted embodiment, a first span $S_1$ is less or smaller than adjacent second span $S_2$, which is less or smaller than adjacent span $S_3$, which is less or smaller than adjacent span $S_4$. Accordingly, for a flow path 300 comprising a plurality of asymmetric notches 302, a span S of each asymmetric notch 302 may be different from an adjacent asymmetric notch 302. Other variations between the flow boundary layer restart features, i.e., the asymmetric notches 302, along the flow direction may be used as well. For instance, the notch depth V could vary from shallower to deeper or deeper to shallower along the flow direction. Varying dimensions such as the span S and/or the notch depth V may affect the heat transfer enhancement provided by the asymmetric notches 302 and, thus, may be tailored to meet varying heat transfer conditions along the flow path 300.

As illustrated in some embodiments of the flow path 300, e.g., in FIGS. 1A, 1B, and 14-17, the flow path 300 may include a fin 362 adjacent each asymmetric notch 302. More particularly, a fin 362 may be defined on the outer surface 308 opposite each asymmetric notch 302 defined in the inner flow path surface 306, such that the fins 362 are an external feature of the flow path 300. In some embodiments, the fins 362 may be integrally formed with the flow path wall 304. The fins 362 may help the flow path 302 maintain mechanical capability, e.g., despite the loss of material in the flow path wall 304 to form the asymmetric notches 302. Further, flow impingement proximal to a base 364 of the fin 362, via the flow of the fluid F into the asymmetric notch 302, may increase heat transfer, e.g., between the fluid F within the flow path 300 and a fluid external to the flow path 300 (such as a fluid in contact with the outer surface 308).

Moreover, as illustrated in FIGS. 1A through 17, the asymmetric notch 302 may comprise a flow expansion angle and a flow contraction angle. For example, for fluid flowing along a flow direction from left to right, e.g., as shown in FIG. 1A, the flow expansion angle may be the first angle α and the flow contraction angle may be the second angle β. The flow expansion and contraction angles may be defined with respect to a flow path surface of the flow path 300, such as inner flow path surface 306, or with respect to a line parallel to the flow path surface, such as the second line 11 (FIGS. 5-8). In exemplary embodiments, the flow expansion angle is not equal to or is different from the flow contraction angle, e.g., based on the position of planar surfaces defining the asymmetric notch 302 as shown in FIG. 6 (which comprises planar first and second surfaces 310, 312); based on one or more features of the asymmetric notch 302 in addition to the planar surfaces, such as the radiused segment 314 shown in FIG. 8 or the ledge segment 330 shown in FIGS. 7 and 8; or based on surface curvature and/or additional features of the surface curvature defining the asymmetric notch 302, such as illustrated in FIGS. 9-14. In any event, the fluid flow encounters an asymmetric feature defined in the flow path surface, which trips the flow to restart the flow boundary layer without bulk flow mixing to minimize the pressure drop within the flow.

The asymmetric flow boundary layer restart features or notches 302 described herein may enhance compatibility with additive manufacturing. More particularly, the asymmetric configuration of the notches 302 may allow the flow path 300 to be easier to form using an additive manufacturing process, such as a 3D printing process. As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. In some embodiments, additive manufacturing technology may enable fabrication of complex objects by building objects point-by-point, layer-by-layer, typically in a vertical direction, but other methods of fabrication are possible and within the scope of the present subject matter, such as other layer-additive processes, layer-subtractive processes, or hybrid processes. It will be appreciated that the asymmetric notches 302 described herein may have a geometry or configuration suitable for additive manufacturing, which may increase or enhance the viability of producing the flow path 300 using an additive manufacturing process.

In other embodiments, other methods for forming the flow path 300 having asymmetric flow boundary layer restart features or notches 302 as a unitary component may be used as well. The term "unitary" as used herein denotes that the associated component, such as the flow path wall 304, is made as a single piece during manufacturing, i.e., the final unitary component is a single piece. Thus, a unitary component has a construction in which the integrated portions are inseparable and is different from a component comprising a plurality of separate component pieces that have been joined together and, once joined, are referred to as a single component even though the component pieces remain distinct and the single component is not inseparable (i.e., the pieces may be re-separated). The final unitary component may comprise a substantially continuous piece of material, or in other embodiments, may comprise a plurality of portions that are permanently bonded to one another. In any event, the various portions forming a unitary component are integrated with one another such that the unitary component is a single piece with inseparable portions. Various additive manufacturing methods as described herein may be used to form a unitary flow path wall 304 having one or more asymmetric features or notches 302, but other suitable manufacturing methods also may be used.

As described herein, the asymmetry in the boundary layer restart feature may be implemented as a wall-embedded notch with unequal flow expansion and contraction angles. Integration of the asymmetrical notch with an external fin may maintain mechanical capability of the flow path, and flow impingement proximity to the fin base may increase heat transfer. The asymmetry also may be implemented as a cascaded combination of ramped and radiused topologies, such as the asymmetric notch having a surface including an angled planar segment followed by a radiused segment. Further, the asymmetry may be established by a cantilevered ledge that may have a sharp edge, a chamfered edge, or a radiused edge as a transition from the boundary layer restart feature to the flow path. Still further, the asymmetry may be established by asymmetric concave or convex surface curvature.

Many thermal design situations may benefit from heat transfer coefficient (HTC) enhancement but cannot afford the flow pressure loss associated with conventional features, such as flow trips in the form of turbulators or the like. As described herein, the asymmetric flow boundary layer restart feature interrupts the thermal boundary layer without bulk flow mixing, which may optimize thermal systems that require minimal changes in pressure (i.e., low $\Delta P$). Moreover, the asymmetry may improve compatibility with additive manufacturing. Further, the boundary layer restart feature may be integrated with a pressurized flow path wall to mitigate stress concentrations at the feature. Additionally or alternatively, a plurality of the boundary layer restart features may be implemented in non-uniform pitch to optimize in-conduit heat transfer to external local heat transfer conditions.

Further aspects of the invention are provided by the subject matter of the following clauses:

1. A flow path comprising a flow path wall defining an inner flow path surface and an asymmetric notch defined in the flow path wall, wherein the asymmetric notch comprises a first surface and a second surface, and wherein the asymmetric notch is asymmetric about a first line extending through an intersection of the first surface with the second surface.

2. The flow path of any preceding clause, wherein the first surface is defined at a first angle $\alpha$, the first angle $\alpha$ defined with respect to the inner flow path surface, and wherein the second surface is defined at a second angle $\beta$, second angle $\beta$ defined with respect to a second line tangent to a bottom of the asymmetric notch.

3. The flow path of any preceding clause, wherein the second surface comprises a first planar segment that intersects the first surface, a radiused segment having a radius, and a second planar segment at a third angle $\gamma$ defined with respect to a third line tangent to an intersection of the radiused segment and the second planar segment.

4. The flow path of any preceding clause, wherein $0° \leq \gamma \leq 20°$.

5. The flow path of any preceding clause, wherein the radiused segment has a first height $H_r$ with respect to the flow path surface, wherein the flow path has a characteristic dimension D, and wherein $0 \leq H_r:D \leq 1:10$.

6. The flow path wall of any preceding clause, wherein the first angle is equal to 0°, and wherein $0° < \beta \leq 90°$.

7. The flow path of any preceding clause, wherein $0° < |\alpha| < 90°$, and wherein $$1 \leq \frac{\tan|\alpha| + \tan\beta}{\tan|\alpha| \times \tan\beta} \leq 230.$$

8. The flow path of any preceding clause, wherein the second surface comprises a ledge segment defined at a fourth angle $\varepsilon$, the fourth angle $\varepsilon$ defined with respect to a sixth line tangent to an intersection of the ledge segment with a first planar segment of the second surface, and wherein $180° \geq \varepsilon > 90°$.

9. The flow path of any preceding clause, wherein a fluid flowing along the flow path flows in a flow direction such that the first surface is upstream of the second surface.

10. The flow path of any preceding clause, wherein a fluid flowing along the flow path flows in a flow direction such that the first surface is downstream of the second surface.

11. The flow path of any preceding clause, wherein a span of the asymmetric notch varies along a wetted perimeter of the flow path wall.

12. The flow path of any preceding clause, wherein the flow path wall and the asymmetric notch defined therein are formed as a unitary component.

13. The flow path of any preceding clause, wherein the flow path wall and the asymmetric notch defined therein are formed using an additive manufacturing process.

14. The flow path of any preceding clause, further comprising a plurality of asymmetric notches, wherein the plurality of asymmetric notches are unevenly spaced along the flow path wall.

15. The flow path of any preceding clause, further comprising a plurality of asymmetric notches, wherein a span of each asymmetric notch of the plurality of asymmetric notches is different from an adjacent asymmetric notch.

16. The flow path of any preceding clause, wherein the asymmetric notch is defined by a first surface and a second surface having asymmetric convex surface curvature.

17. The flow path of any preceding clause, wherein an outer flow path surface of the flow path wall comprises the first surface and the second surface, and wherein the flow path wall defines a plurality of tubes for a flow of a first fluid within the plurality of tubes and a flow of a second fluid over the outer flow path surface.

18. The flow path wall of any preceding clause, wherein the plurality of tubes together form a heat exchanger body, and wherein the heat exchanger body is asymmetric about at least two orthogonal axes.

19. A flow boundary layer restart feature comprising a first surface extending inward with respect to a flow path surface of a flow path and a second surface extending inward with respect to the flow path surface, wherein the second surface is asymmetric with respect to the first surface such that the first surface and the second surface define an asymmetric notch.

20. The flow boundary layer restart feature of any preceding clause, wherein the first surface and the second surface have asymmetric concave surface curvature.

21. The flow boundary layer restart feature of any preceding clause, wherein the flow path surface is an inner flow path surface of the flow path.

22. The flow boundary layer restart feature of any preceding clause, wherein the flow path surface is an outer flow path surface of the flow path.

23. A flow path comprising a flow path wall defining a flow path surface and an asymmetric notch defined in the flow path wall, the asymmetric notch comprising a flow expansion angle and a flow contraction angle, each of the flow expansion angle and the flow contraction angle measured with respect to the flow path surface, wherein the flow expansion angle and the flow contraction angle are unequal.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A flow path apparatus, comprising:
a flow path wall defining an asymmetric notch,
wherein the asymmetric notch is defined at an intersection between a first surface and a second surface of the flow path wall, wherein the intersection between the first surface and the second surface has an asymmetric convex surface curvature at the asymmetric notch, wherein the asymmetric notch is asymmetric about a first line extending through an intersection of the first surface with the second surface; and
wherein the flow path wall defines an outer flow path surface, and wherein the flow path wall defines a plurality of tubes for a flow of a first fluid within the plurality of tubes and a flow of a second fluid over the outer flow path surface.

2. The flow path apparatus of claim 1, wherein the outer flow path surface comprises the first surface and the second surface defining the asymmetric notch.

3. The flow path apparatus of claim 2, wherein a first tube of the plurality of tubes comprises a first portion of the outer flow path surface and a second tube of the plurality of tubes comprises a second portion of the outer flow path surface, and wherein the first portion of the outer flow path surface defines the first surface and the second portion of the outer flow path surface defines the second surface.

4. The flow path apparatus of claim 1, wherein the plurality of tubes together form a heat exchanger body, and wherein the heat exchanger body is asymmetric about at least two orthogonal axes.

5. The flow path apparatus of claim 1, wherein each tube of the plurality of tubes is an asymmetric elliptical tube.

6. The flow path apparatus of claim 5, wherein each tube of the plurality of tubes comprises a forward major semi-axis having a length a, a forward minor axis having a length b, an aft major semi-axis having a length c, and a tube wall thickness t, and wherein a pitch length $L_P$ from the forward minor axis of a respective tube of the plurality of tubes to an adjacent tube of the plurality of tubes is equal to a sum of the aft major semi-axis length c, the tube wall thickness t, and the forward major semi-axis length a.

7. The flow path apparatus of claim 5, wherein each tube of the plurality of tubes comprises a forward major semi-axis having a length a, a forward minor axis having a length b, and an aft major semi-axis having a length c, and wherein $$5 \geq \frac{c}{b} > \frac{a}{b} > \frac{1}{2}.$$

8. The flow path apparatus of claim 1, wherein the flow path wall defines a radiused segment projecting from the outer flow path surface into the flow of the second fluid, and wherein a tube wall thickness t of the plurality of tubes varies along a flow direction of the flow of the second fluid.

9. The flow path apparatus of claim 1, wherein the flow path wall defines an outer flow path surface, and wherein the outer flow path surface defines a ledge segment at the asymmetric notch.

10. The flow path apparatus of claim 9, wherein the flow path wall defines a plurality of tubes for a flow of a first fluid within the plurality of tubes and a flow of a second fluid over the outer flow path surface, and wherein the ledge segment has a height $H_1$ projecting into the flow of the second fluid.

11. The flow path apparatus of claim 9, wherein the ledge segment projects along a span S of the asymmetric notch.

12. The flow path apparatus of claim 10, wherein the flow path wall defines a plurality of asymmetric notches, and wherein the plurality of asymmetric notches are unevenly spaced along the flow path wall.

13. The flow path apparatus of claim 10, wherein the flow path wall defines a plurality of asymmetric notches, and wherein a span of each asymmetric notch of the plurality of asymmetric notches is different from an adjacent asymmetric notch.

14. The flow path apparatus of claim 10, wherein the flow path wall defines a plurality of asymmetric notches, and wherein the plurality of asymmetric notches define a cyclical cascade of boundary layer restarts along a flow direction of a fluid flowing over the plurality of asymmetric notches.

15. A flow boundary layer restart feature, comprising:
a first surface extending inward with respect to a flow path surface of a flow path; and
a second surface extending inward with respect to the flow path surface,
wherein the first surface intersects with the second surface to from an asymmetric notch having an asymmetric convex surface curvature at the asymmetric notch, wherein the flow path surface is an outer flow path surface of the flow path and wherein the first surface is defined by a first tube of a plurality of tubes defining a heat exchanger body, and wherein the second surface is defined by a second tube of the plurality of tubes.

16. A flow path wall, comprising:
an inner flow path surface;
an outer flow path surface; and
an asymmetric notch comprising a maximum flow expansion angle and a maximum flow contraction angle, each of the maximum flow expansion angle and the maximum flow contraction angle measured with respect to the outer flow path surface,
wherein the maximum flow expansion angle and the maximum flow contraction angle are unequal,
wherein the flow path wall defines a plurality of tubes for a flow of a first fluid within the plurality of tubes and a flow of a second fluid over the outer flow path surface, wherein each tube of the plurality of tubes is an asymmetric elliptical tube, wherein each tube of the plurality of tubes comprises a forward major semi-axis having a length a, a forward minor axis having a length b, and an aft major semi-axis having a length c, and wherein $5 \geq c/b > a/b > 1/2$.

* * * * *